United States Patent [19]

Hawryluk

[11] Patent Number: 5,745,286
[45] Date of Patent: Apr. 28, 1998

[54] FORMING ASPHERIC OPTICS BY CONTROLLED DEPOSITION

[75] Inventor: Andrew M. Hawryluk, Modesto, Calif.

[73] Assignee: Regents of the University of California, Oakland, Calif.

[21] Appl. No.: 542,758

[22] Filed: Oct. 13, 1995

[51] Int. Cl.$^6$ ............... G02B 5/08; G02B 1/10; G02B 5/10

[52] U.S. Cl. .......... 359/359; 359/350; 359/355; 359/360; 359/584; 359/589; 359/868

[58] Field of Search ............ 359/355, 359, 359/360, 582, 584, 585, 589, 718, 868, 350; 65/60.1, 60.2, 60.4, 60.6, 60.8; 427/162, 164, 165, 166; 378/34

[56] References Cited

U.S. PATENT DOCUMENTS 4,738,516  4/1988  Verhoeven et al. .............. 359/718
5,003,567  3/1991  Hawryluk et al. ............... 378/34
5,400,182  3/1995  Chiba ........................ 359/718
5,433,988  7/1995  Fukuda et al. ................ 428/141

*Primary Examiner*—Paul M. Dzierzynski
*Assistant Examiner*—Darren E. Schuberg
*Attorney, Agent, or Firm*—Henry P. Sartorio; L. E. Carnahan

[57] ABSTRACT

An aspheric optical element formed by depositing material onto a spherical surface of an optical element by controlled deposition to form an aspheric surface of desired shape. A reflecting surface, single or multi-layer, can then be formed on the aspheric surface by evaporative or sputtering techniques. Aspheric optical elements are suitable for deep ultra-violet (UV) and x-ray wavelengths. The reflecting surface may, for example, be a thin (~100 nm) layer of aluminum, or in some cases the deposited modifying layer may function as the reflecting surface. For certain applications, multi-layer reflective surfaces may be utilized, such as chromium-carbon or tungsten-carbon multi-layer, with the number of layers and thickness being determined by the intended application.

20 Claims, 2 Drawing Sheets

FORMING ASPHERIC OPTICS BY CONTROLLED DEPOSITION

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention is directed to optical elements, such as mirrors and lenses, particularly to aspheric mirrors and lenses, and more particularly to a process for fabricating aspheric optics by controlled deposition suitable for deep ultra violet and x-ray wavelengths.

Currently, most lenses and mirrors for deep ultra violet (UV) wavelengths are reflective spherical surfaces produced by highly accurate polishing techniques. These spherical optics suffer from off-axis aberrations resulting in limited resolution and field of view. Some aspheric mirrors for deep UV and x-ray wavelengths have been made by machining, such as diamond turning. In theory, these aspheric optics should have improved resolution and field of view. However, they suffer from surface roughness (approximately 1 nm) and figure errors (approximately 10 nm).

The ability to image with submicron resolution is provided by the present invention, which involves apheric mirrors and lenses suitable for deep UV and x-ray wavelengths, and a process for producing same which utilizes controlled modification, via a deposition technique of single or multilayer materials, on commercially available flat and spherical surfaces. Depending on the material utilized in the formation of the aspheric surface, an additional reflective layer, either single or multi-layer, may be deposited on the thus formed aspheric surface, since the aspheric surface may or may not be reflective.

SUMMARY OF THE INVENTION

It is an object of the present invention to provide aspheric optics.

A further object of the invention is to provide for forming aspheric optics by controlled deposition of single or multi-layer materials.

A further object of the invention is to provide aspheric lenses and mirrors for deep UV and x-ray wavelengths.

A still further object of the invention is to provide a process for forming such aspheric lenses and mirrors on flat and spherical surfaces by controlled deposition of single or multilayer materials.

Another object of the invention is to provide aspheric optics having a reflective surface formed by deposition of the materials forming the aspheric surface, depositing a single layer of reflective material on the aspheric surfaces or depositing multi-layers of selected materials on the aspheric surface.

Another object of the invention is to provide a process for forming an aspheric surface of a desired shape and forming a reflecting multi-layer surface on the aspheric surface.

Other objects and advantages will become apparent from the following description and accompanying drawings. The invention involves aspheric optical elements formed by controlled deposition, using known deposition techniques, such as evaporation or sputtering, and thereafter, depositing a single or multi-layer surface by conventional deposition techniques to a desired thickness. The aspheric surface may be formed on flat or spherical surfaces of commercially available optical components. Thus, by this invention, aspheric lenses and mirrors are available for deep UV and x-ray wavelength applications, which do not suffer from the above-referenced surface roughness and configuration errors, as in the machined aspheric surfaces. Thus, highly accurate aspheric surfaces can be fabricated by modifying an inexpensive spherical or flat surface using controlled deposition techniques and can be utilized in applications such as lithography, microscopy, and microprobe analysis, as well as in deep UV lasers.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

The invention involves aspheric optics, mirrors, and lenses, suitable for deep ultra violet (UV) and x-ray wavelengths, and a process for fabricating same utilizing controlled deposition techniques, (such as evaporation and sputtering) of single or multilayer materials. The aspheric optic may be formed on commercially available flat and spherical optical components. The aspheric optic elements made in accordance with this invention enable imaging with submicron resolution. The difference being a perfect spherical surface and an optimized (ideal) aspheric surface is illustrated in FIG. 1, with an example of a process involving controlled deposition for converting a spherical surface to an aspheric surface being illustrated in FIG. 2.

Figure 1:
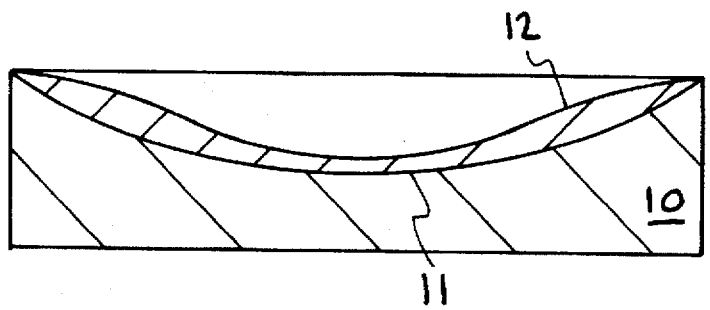
FIG. 1 is a view of an optical element or substrate illustrating both a spherical surface and an aspheric surface.

As shown in FIG. 1, a substrate optical component 10 has a spherical surface 11 which is converted to an aspheric surface 12 by utilizing a controlled deposition technique, for example, evaporation or sputtering, material is deposited onto the spherical surface to modify it so that the surface becomes the desired aspheric configuration. Any material can be used (i.e. carbon, aluminium, selected compounds) to form the aspheric surface provided the deposited material is smooth and does not degrade the surface finish. For example, highly polished, inexpensive spherical surfaces can be commercially obtained with surface roughness of <1 nm. The deposited material should maintain this quality and have similar surface roughness. Mirror performance will degrade if the roughness of the deposited material is significantly increased over that of the original spherical surface. Multilayer depositions can be made sufficiently smooth to maintain the required surface quality.

Figure 2:
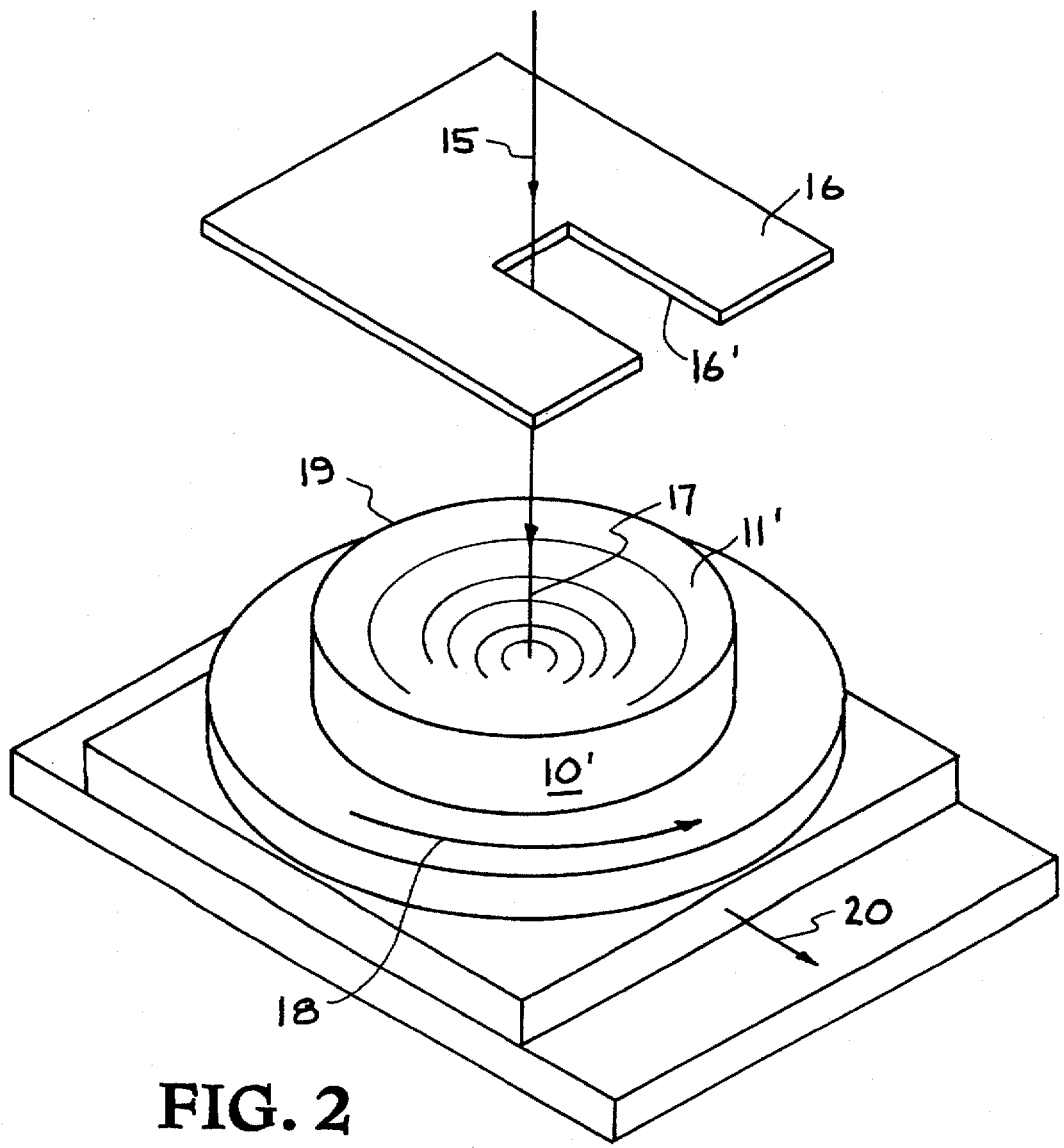
FIG. 2 schematically illustrates the aspheric surface fabrication on an upper spherical surface of a substrate.

The process, as seen in FIG. 2, basically involves the deposition indicated by arrows 15 of a material (by evaporation or sputtering, for example) through a mask 16 having an opening 16', and onto a spherical upper surface 11' of a substrate 10' which is rotated about its axis (w) 17 as indicated by arrow 18, with the deposition 15 being controlled as it is deposited outwardly from the center or axis 17 to an outer edge 19 of the spherical surface 11', as indicated by the arrow 20 via computer controlled translation of the material being deposited. Thus, by comparing spherical surface 11 with the aspheric surface 12 of FIG. 1, as the material is deposited from a central section thereof outwardly, it is deposited at a controlled rate to produce the desired thickness to form the desired aspheric surface configuration. The opening 16' in mask 16 may be of any desired configuration.

Figure 3:
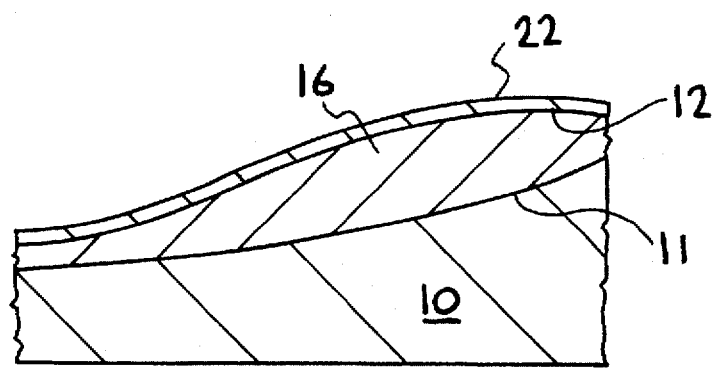
FIG. 3 is a greatly enlarged partial cross section of an aspheric mirror having a reflecting surface layer deposited on the aspheric surface, such as shown in FIG. 1.

For applications that require reflective coatings, after surface modifiction to form the aspheric surface 12, for example, and depending on the material deposited on the spherical surface 11, a reflective layer 22 is deposited onto the aspheric surface 12 by either an evaporative or sputtering technique, as shown in FIG. 3. For some deep UV applications a thin (~100 nm) layer 22 of a highly reflective material, such as aluminum, is sufficient. In some applications, the deposited modifying material 21 may function as a reflecting material, thus eliminating the need for reflective layer 22. Depending on the application, the reflective material, in addition to aluminum, may be composed of silver or chromium.

Figure 4:
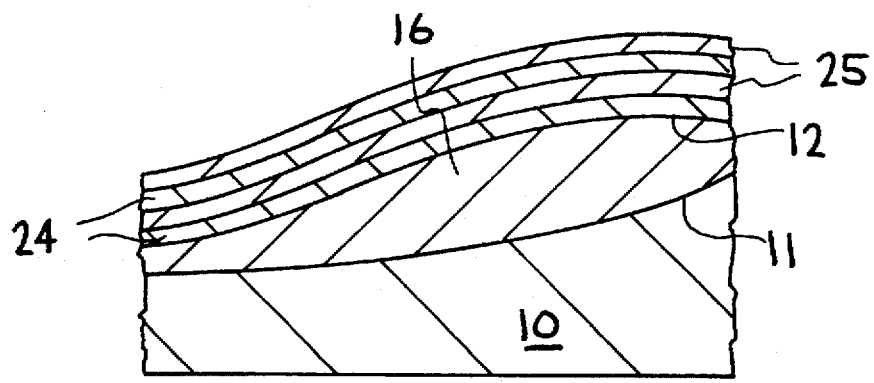
FIG. 4 is a greatly enlarged partial cross-section of an aspheric mirror having a multi-layer reflecting surface deposited thereon.

For many UV and x-ray applications, such as soft x-ray (or EUV) lithography, and microscopy (1 nm<$\lambda$<200 nm), a multi-layer reflective surface may be necessary. The parameters for the multi-layer reflector are determined by the wavelength of the radiation and the eventual application of the mirror or lens. FIG. 4 illustrates a multi-layer reflective surface, indicated generally at 23 and composed of alternating layers 24 and 25. For example, to reflect 4.5 nm radiation, a chromium-carbon or tungsten-carbon multilayer 23 may be used with a "d" spacing of roughly 2.0–2.5 nm. To reflect 13 nm radiation, molybdenum-silicon multilayers, with a "d-spacing" of approximately 6.5 nm are preferred. The desired spectral bandwidth and required reflectivity of the mirror will determine the exact "d" spacing, required, (defined as the combined thickness of two adjacent layers of material in the multilayer structure), the material combinations, the number of layers, and the ratio of thinkness of the two alternating layers of the multilayer. For example, with a bandwidth of 0.5 to 1 nm and reflectivity of 70% at $\lambda$=13 nm, the "d" spacing is 6.5 nm, the number of layers is 80, and the ratio of the thickness of the two layers is about 1.5 to 1 with one layer being of silicon with a thickness of 3.9 nm, and the other layer being of molybdenum with a thickness of 2.6 nm. Other materials may be used in the multi-layer including carbon, chromium, tungsten, beryllium, and boron.

The present invention provides a process to form an aspheric optical element by controlled deposition of selected materials (including multilayers) on a flat or spherical surface. Such aspheric surfaces may be effectively utilized in deep UV and x-ray mirrors and lenses. Mirrors and lenses made in accordance with the present invention have applications in lithography, microscopy, microprobe analysis, and in deep UV lasers. Thus, the present invention enables imaging with submicron resolution, not available using machined aspheric surfaces, because of improved resolution and field of view, without surface roughness and configuration errors of the machined aspheric surfaces. By use of single layer and multi-layer reflective surfaces deposited on the aspheric surface increased applications for aspheric optics becomes available to those skilled in the field.

While particular embodiments, process sequence, materials, parameters, etc. have been described or illustrated to exemplify the aspheric optics and the process for fabricating same, such are not intended to be limiting. Modifications and changes may become apparent to those skilled in the art, and it is intended that the invention be limited only by the scope of the appended claims.

The invention claimed is:

1. An optic component for deep ultra violet and x-ray wavelengths, comprising:

a substrate, an aspheric surface on said substrate, said aspheric surface being composed of reflective material and at least one layer of reflective material on said substrate.

2. The optic component of claim 1, wherein said at least one layer of reflective material is composed of the material forming said aspheric surface.

3. The optic component of claim 1, wherein said at least one layer of reflective material comprises a layer deposited on said aspheric surface selected from the group consisting of aluminum, silver, and chromium.

4. The optic component of claim 1, wherein said at least one layer of reflective material comprises a multi-layer deposited on said aspheric surface.

5. The optic component of claim 4, wherein said multi-layer is composed of alternating layers of material.

6. The optic component of claim 5, wherein at least one of the alternating layers is reflective.

7. The optic component of claim 4, wherein said multi-layer is formed of layers of material selected from the group consisting of chromium, tungsten, carbon, beryllium, boron, silicon and molybdenum.

8. The optic component of claim 7, wherein said multi-layer is composed of chromium-carbon, tungsten-carbon, boron-carbon, silicon-molybdenum, and other material combinations that deposit as smooth layers.

9. The optic component of claim 4, wherein said at least one layer of reflective material has a smooth surface.

10. The optic component of claim 4, wherein said multi-layer is composed of a number of layers, having a ratio of thickness of the layers and "d" spacing determined by spectral bandwidth and reflectivity of the component in which it will be utilized.

11. The optic component of claim 1, wherein the aspheric surface is formed by controlled deposition of single or multilayer films.

12. A process for forming an optical element with an aspheric surface, comprising:

providing an optical element having a surface on which the aspheric surface is to be formed, controllably depositing material onto the surface to form as aspheric surface, and providing a reflecting surface on the aspheric surface by depositing reflective material to form the aspheric surface.

13. The process of claim 12, wherein the surface on which the aspheric surface is to be formed is a spherical surface.

14. The process of claim 12, wherein the forming of the reflective surface is carried out by depositing a layer of reflective material on the aspheric surface.

15. The process of claim 12, wherein the forming of the reflective surface is carried out by depositing a multi-layer containing reflective material on the aspheric surface.

16. The process of claim 15, wherein the multi-layer contains alternating layers of different materials.

17. The process of claim 12, wherein the controllably depositing of the material is carried by techniques selected from evaporation deposition and sputtering deposition.

18. A process for forming an optical element with an aspheric surface, comprising:

provicing an optical element having a surface on which the aspheric surface is to be formed controllably depositing reflective material onto the surface to form an aspheric surface, and providing a reflecting surface on the aspheric surface.

19. The process of claim 18, wherein the reflective surface is provided by depositing a layer of reflective material on the aspheric surface.

20. The process of claim 18, wherein the reflective surface is provided by depositing multi-layers containing reflective material on the aspheric surface.

* * * * *